Oct. 11, 1949.  K. ALBERTI  2,484,005
MOLDING AND PACKAGING MACHINERY
Filed Dec. 14, 1945  4 Sheets-Sheet 1

INVENTOR.
Karl Alberti,
BY Bair & Freeman
Attys.

Oct. 11, 1949.  K. ALBERTI  2,484,005
MOLDING AND PACKAGING MACHINERY
Filed Dec. 14, 1945  4 Sheets-Sheet 3

INVENTOR.
Karl Alberti
BY Bair & Freeman
Attys.

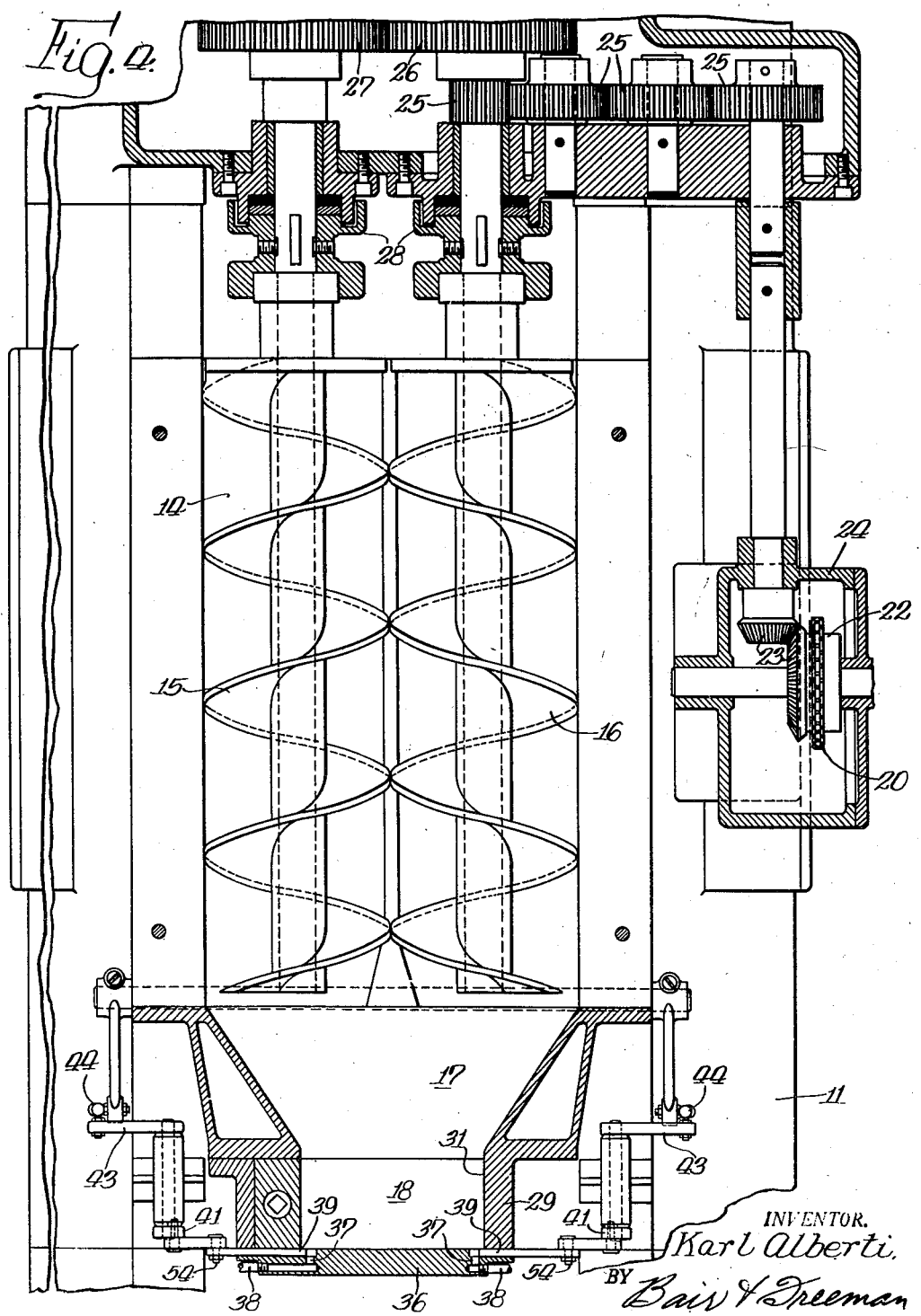

Patented Oct. 11, 1949

2,484,005

UNITED STATES PATENT OFFICE 2,484,005

MOLDING AND PACKAGING MACHINERY

Karl Alberti, Toledo, Ohio, assignor to Lynch Manufacturing Corporation, Defiance, Ohio, a corporation of Ohio Application December 14, 1945, Serial No. 635,019

8 Claims. (Cl. 31—8)

1

This invention relates to molding and packaging machinery and particularly to machinery for molding and packaging semi-viscous or semi-plastic materials such as butter, lard or the like, in print form.

This invention provides an improvement over the construction shown in Heft et al. Patent #2,258,288 issued October 7, 1944.

One of the problems which has been prevalent in the automatic packaging of materials such as butter, cheese or lard, has been the difficulty of maintaining a constant weight for each mold of the material made. This is due primarily to entrapped air, usually at the upper corners of each mold, which prevented the material being packaged from entering the spaces mentioned. Placing a small extra amount of the material in each mold proved unsatisfactory because some articles molded did not have entrapped air and the loss of material in packaging thousands of pounds of butter or lard a week was too large. If the packages are underweight, on the other hand, rejects resulted. Merely venting the mold during the time the material is entering, as shown in the aforesaid Heft et al. patent, was not completely satisfactory because the valve must close before the material completely fills the mold, and small amounts of entrapped air were still present in some instances.

This invention, therefore, has as its main object the accurate control of the amount of material molded on every molding operation of the molding machine and the elimination of air pockets in the molding process. Another object of the invention is to provide an improved valve structure for the mold of a packaging machine for packaging semi-viscous or semi-plastic materials.

A further object of the invention is to provide an improved system for venting the mold of such a machine at each molding operation.

Still another object of the invention is to properly time an air venting system in a packaging machine for semi-viscous or semi-plastic materials, so that there is very little waste of material due to the venting operation, even though substantially all entrapped air is effectively removed.

With these and other objects in view, my invention consists in the construction, arrangement and combinations of the various parts of my device whereby the objects contemplated are attained, as hereinafter more fully set forth, pointed out in my claims and illustrated in the accompanying drawings, wherein:

Fig. 1 is a view showing parts of a packaging machine in front elevation and parts in section

2 and illustrates the application of a preferred embodiment of the invention to a molding and packaging machine;

Figure 4 is a horizontal sectional view of a portion of the packaging machine taken on line 4–4 of Figure 1;

Figures 5 and 6 are enlarged plan and top views respectively of one of the improved valves, both valves being substantially of the same shape; and Figure 7 is a partial enlarged perspective view of the valves as applied to the end face of the mold.

Figure 1:
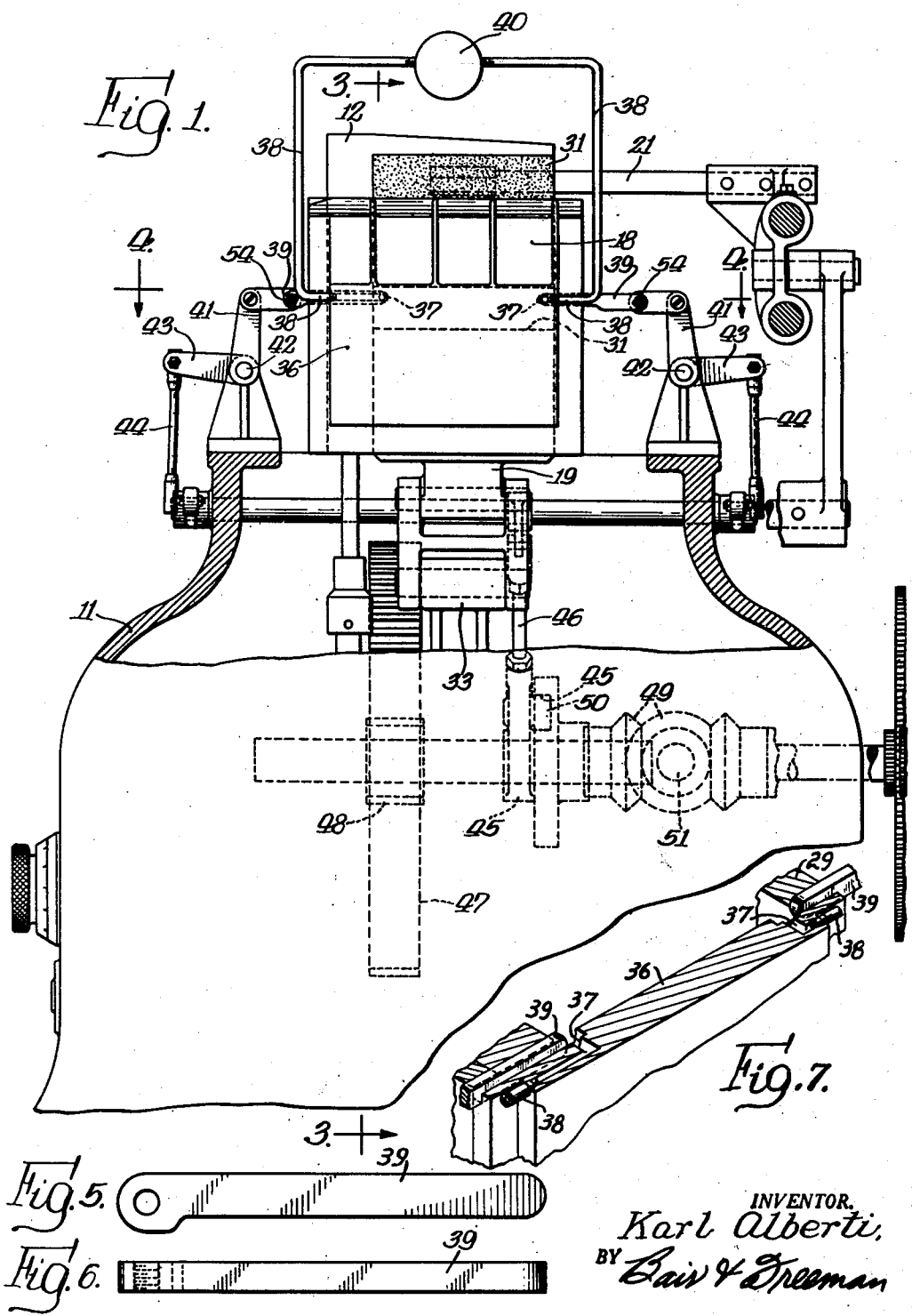
Figure 2:
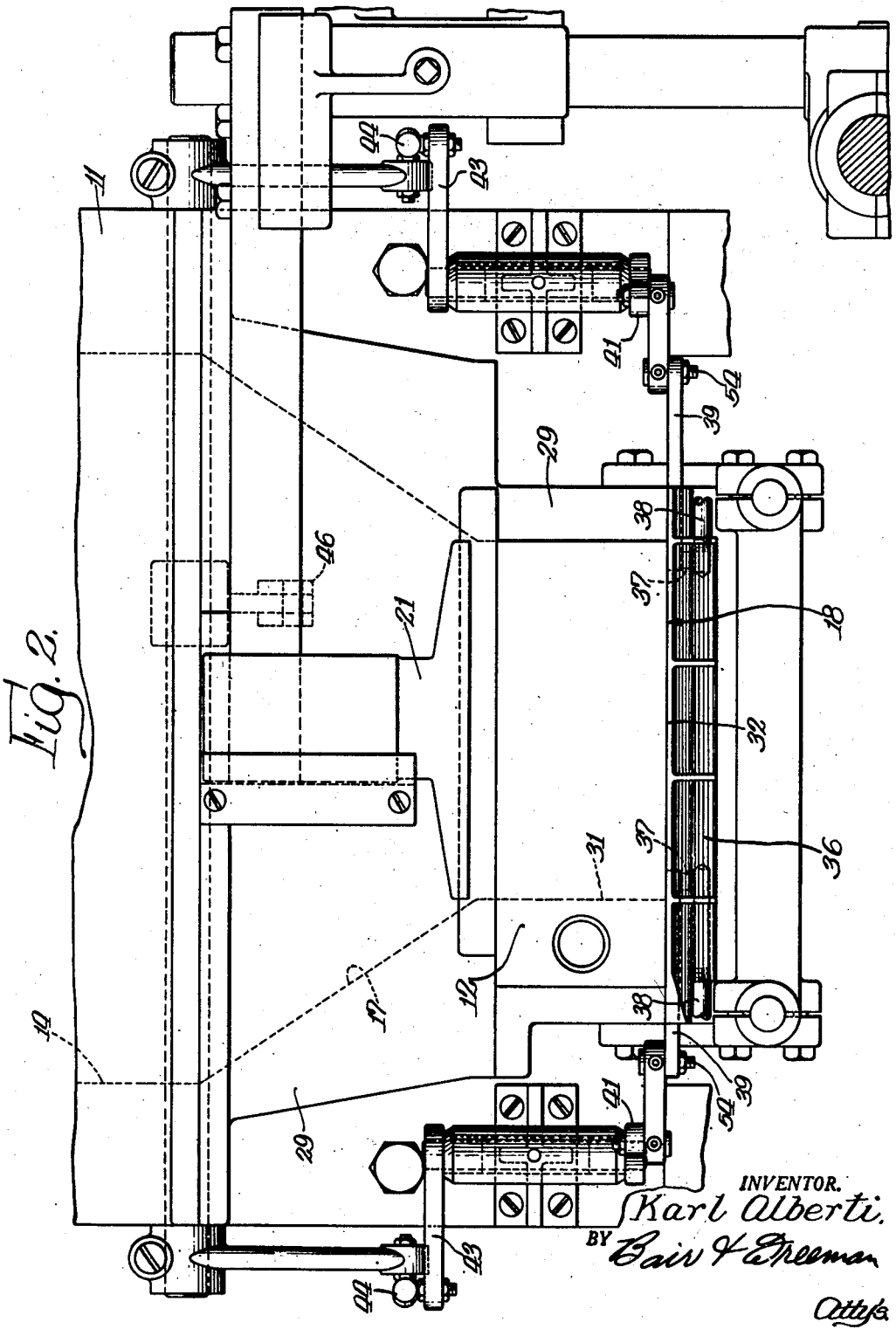
Fig. 2 is a fragmentary enlarged top plan view of a portion of the packaging machine illustrated in Fig. 1.

Referring specifically to the drawings for a detailed description of the invention, numeral 11 designates a supporting base for the machine, which houses generally the actuating gears and levers for the molding and packaging elements. In these drawings, only the molding portion of the packaging machine is illustrated, because the present invention is confined to improvements therein.

Mounted above the supporting base is a hopper 12, into which the material to be packaged is charged and fed by a paddle wheel 13 into a chamber 14 containing spiral feeding members 15 and 16, a compressing chamber 17, a mold 18 defining a mold cavity generally indicated at 31, an ejecting elevator 19 and a ram 21 for removing the mold or print from the elevator 19.

The spiral feed members 15 and 16, which are preferably formed of metal are driven by a chain 20 which rotates a sprocket wheel 22. Bevel gears 23, contained in a casing 24, are rotated by a drive shaft (not shown) and rotates pinion gears 25 to rotate the spiral feed member 16. Feed member 16 has a gear 26 thereon which engages a gear 27 on the feed member 15 and thus the feed member 15 is rotated when feed member 16 is operated by gears 23 and 25. Suitable bearings and packings, generally indicated at 28 are provided for the spiral feed members 15 and 16. The spiral feed members 15 and 16 are recurrently rotated to feed a charge of the material to the mold cavity 31 and thereafter stop until the elevator has discharged a print and has returned to its material receiving position, whereupon the feed members 15 and 16 are again rotated to deliver another charge. Any conventional means may be employed to bring about intermittent movement of the feed members 15 and 16 and to correlate this movement with that of the elevator 19, for instance, the means shown in the above identified patent to Heft.

Figure 3:
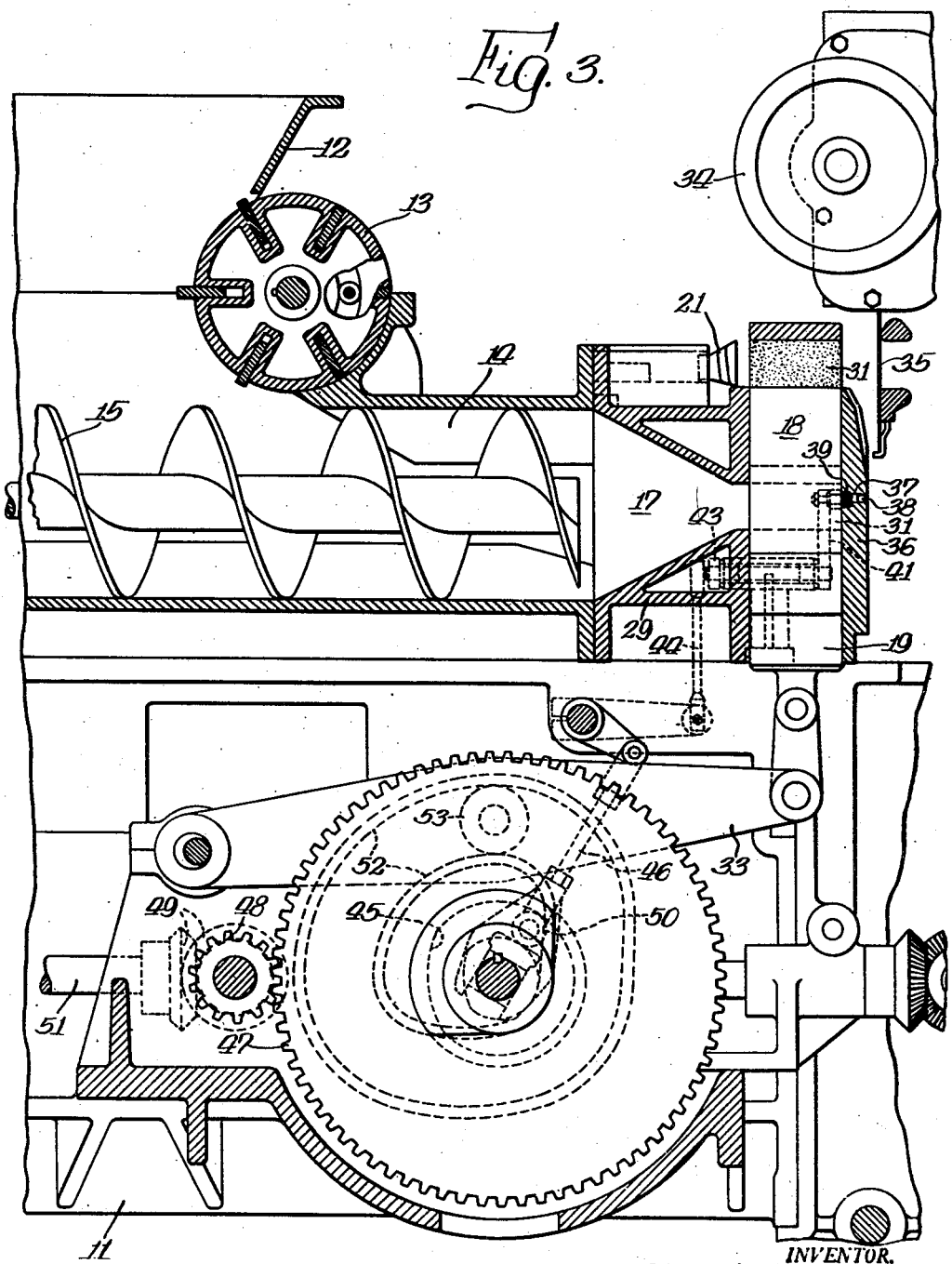
Fig. 3 is a vertical sectional view of a portion of the packaging machine taken on line 3–3 of Fig. 1.

Mounted on the base 11 is a casting 29 in which the compressing chamber 17 is formed. The chamber 17 tapers inwardly from the feed members 15 and 16 and is aligned with the mold or print cavity 31, as best shown in Figs. 1 and 3. The mold cavity 31 is formed in the mold 18 and is preferably rectangular in cross-section and elongate in a horizontal direction. The mold 18 is moved upwardly by elevator 19. The elevator 19 is pivotally connected to a link 33 which imparts recurrent reciprocating motion to the elevator 19 and mold 18 in a manner hereinafter described, so that when the mold cavity 31 is filled with material the mold 18 is raised and the print or mold ejected by the ram 21. For this purpose, the mold cavity 31 is open at its front and top, as best shown in Figure 3. A wheel 34, containing wax paper 35 is provided for wrapping the ejected print, but since this feature forms no part of the present invention, further description is dispensed with.

Formed in a front wall or plate 36, substantially in alignment with the upper corners of the mold cavity 31, when in its material receiving position, are substantially round vent openings or ports 37 which communicate with conduits 38, preferably extending from the sides of the front plate 36. The round vent openings 37 are adapted to be opened and closed by slide valves 39, which also extend through the sides of the front plate 36 and are reciprocated through bell crank levers 41 pivoted and moved by links 43 connected to rods 44. The rods 44 have recurrent reciprocating movement imparted to them through a cam track 45, on which a roller 50 rides, which roller is secured to linkage 46. The cam track 45 is rotated by movement of a large gear wheel 47 driven from a smaller gear 48. The small gear 48 is in turn driven by a bevel gear 49 which is rotated by a power shaft 51.

In order to insure that all entrapped air is removed from the mold cavity 31 when the material is forced into the cavity, the cam track 45 maintains the slide valves 39 in the open position during most the time that the spiral feeding members are feeding material into the mold cavity. Valve opening and closing are preferably timed relative to the position of the mold 18. This is accomplished by imparting the proper contour to a cam track 52 in which a roller 53 travels, which roller is secured to arm 33 and reciprocates the same. The large gear 47 rotates both the cam track 52 and the cam track 45, thus insuring proper timing. Just before the elevator 19 starts to move upwardly to the ejecting position, the cam track 45 effects closing of the valves. In accordance with this invention, the conduits 38 are connected to a vacuum source such as a vacuum pump 40 shown diagrammatically in Fig. 1 and connected by dot and dash lines to conduits 38. As soon as the elevator 19 reaches the lower position for filling, the feeding members 15 and 16 start to rotate and force material into the mold cavity tending to compress air therein. However, simultaneously with the initiation of feeding, the cam track 45 opens the valves 39 and any air in the mold cavity 31 is withdrawn through the valve ports 37 and conduits 38. Just prior to the time the elevator 19 and mold 18 start to move upwardly due to the contour of trackways 45 and 52, and the feeding members 15 and 16 stop rotating, and the cam 45 effects closing of the valves 39 so that no material is forced into the ports 37 or the conduits 38. However, since the mold cavity 31 is substantially air tight, the vacuum will remain therein after the valves 39 are closed and the vacuum will assist the material in the mold to be forced and drawn into the mold cavity 31 and fill all spaces and corners therein.

As shown in Figs. 5, 6 and 7 the valves 39 are formed of flat bar stock material and are provided with openings for connection to the bell crank levers 41 by pins 54, as shown in Fig. 1. The shape of the valve 39 ensures positive opening and closing thereof and because of its sliding movement it is self cleaning. Furthermore, the valves 39 are very inexpensive to fabricate and machine.

From the foregoing, it will be apparent that I have provided an improved molding and packaging machine which will ensure each print of the material to be molded and packaged to be of the same weight and shape. This is accomplished primarily by the improved slide valve for the vent ports of the mold cavity and by the application of vacuum to said cavity to remove all entrapped air therefrom.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a machine for molding semi-plastic materials into prints, an open ended mold for receiving said material under pressure, a port in the print of said mold, a valve for opening and closing the port, said mold including a valve seating surface exteriorly of the mold, and a flat slide valve for opening and closing said port and cooperating with said seat.

2. In a machine for molding semi-plastic materials into prints, means for recurrently advancing the material under pressure, a box like mold having an opening therein for receiving a predetermined amount of said material, said mold being movable between a first position in which said opening is disposed in the path of the advancing material and a second position in which a print formed in said opening may be ejected therefrom, a valve port in the front of the mold for venting air therefrom during the time the material is being advanced, a source of vacuum connected to the valve port to withdraw air from the mold when said valve is open, a ram for moving prints out of said mold, means for moving said mold to said second position and back to said first position and valve operating means for closing said valve when said mold is being moved to said second position, said advancing means being rendered ineffective while said mold is being moved to said second position and being rendered effective when said ram is returned to said first position and said valve operating means also opening said valve to apply the vacuum as the advancing means forces material into said mold.

3. In a machine for molding semi-plastic materials into prints, means for recurrently advancing the material under pressure, a box like mold having an opening therein for receiving a predetermined amount of said material, said mold being movable from a first position in which said opening is disposed in the path of the advancing material and a second position in which a print formed in said opening may be ejected therefrom, a valve port in the front of the mold for venting air therefrom during the time the material is being advanced, a source of vacuum connected to the valve port to withdraw air from the mold when said valve is open, a ram for moving prints out of said mold, ram means for moving said mold to said second position and back to said first position, and valve operating means for closing said valve when said mold is being moved to said second position, said advancing means being rendered ineffective while said mold is being moved to said second position and being rendered effective when said mold is returned to said first position and said valve operating means also opening said valve to apply the vacuum as the advancing means forces material into said mold.

4. In a machine for molding semi-plastic material into prints, means for advancing the material under pressure, a box-like open ended mold for containing a predetermined amount of material, means for recurrently forcing material into said mold, a valve port in the print of said mold for venting air therefrom during the time material is being forced therein, a valve for opening and closing said valve port, a source of vacuum connected to said valve port to withdraw air from said mold when said valve is opened, means for removing a print from said mold and timing means for closing said valve port when said material is being removed, said advancing means being rendered inactive during the removal of said print and being rendered active after said print is removed, said timing means also opening said valve port to apply said vacuum as material is moved into said mold.

5. In a machine for molding semi-plastic material into prints, means for advancing the material under pressure, a box-like open ended mold for containing a predetermined amount of material, means for recurrently forcing material into said mold, a valve port in the print of said mold for venting air therefrom during the time material is being forced therein, a valve for opening and closing said valve port, a source of vacuum connected to said valve port to withdraw air from said mold when said valve is opened, means for removing a print from said mold and timing means for closing said valve port when said material is being removed, said advancing means being rendered inactive during the removal of said print and being rendered active after said print is removed, said timing means also opening said valve port to apply said vacuum as material is moved into said mold, said timing means comprising two cams disposed in predetermined relationship to each other, a common driving means for said cams, one of said cams actuating means for removing the print from the mold and the other of said cams for actuating said valve.

6. In a machine for molding semi-plastic materials into prints, means for advancing material under pressure, a box-like open ended mold for containing a predetermined amount of material, means for recurrently advancing the material into said mold, a valve port in the front of said mold for venting air therefrom during the time material is being advanced, a valve for opening and closing said valve port, a source of vacuum connected to said valve port to withdraw air from said mold when the valve is open, means for removing a print from said mold, means for closing said valve while said print is being removed from the mold, said last means comprising operating levers and links, a cam surface for operating said levers and links, said advancing means being rendered inactive during removal of said print from the mold and being rendered active when the print is so removed, said last named means also being effective to open said valve to apply the vacuum when the advancing means is delivering material to said mold.

7. In a machine for molding semi-plastic material into prints, means for recurrently advancing the material under pressure, a box-like open-ended mold, a front plate cooperating with said mold to define a mold cavity adapted to contain a predetermined amount of material, said mold being movable from a first position in the path of said advancing material to a second position wherein a print formed in said cavity may be ejected from said mold, a valve port in the front plate for venting air therefrom during said material receiving period, a valve seat on a portion of said front plate exteriorly of the portion of said mold containing said material, a valve for opening and closing said port, said valve being flat on its seating side and being positioned to slide across the valve seat, a source of vacuum connected to said valve port to withdraw air from said mold when said valve is open, means for moving said mold from one to the other of said positions and valve operating means for closing said valve when said mold is being advanced to said second position, said advancing means being rendered ineffective until said mold has been returned to said first position, said valve operating means also opening said valve to apply said vacuum as said advancing means forces material into said mold.

8. In a machine for molding semi-plastic material into prints, means for advancing the material under pressure, a box-like open mold for containing a predetermined amount of material movable between a first position in which said mold is disposed in the path of said advancing means to receive said material and a second position in which a print formed in said mold may be ejected therefrom, a valve port in front of said mold for venting air therefrom during said material receiving period, a valve for opening and closing said valve port, a source of vacuum connected to said valve port to withdraw air from said mold when said valve is open, means for moving said mold from one to the other of said positions including a cam and links, and means for closing said valve when said mold is being moved comprising a second cam, links and operating levers.

KARL ALBERTI.

REFERENCES CITED

The following references are of record in the file of this patent:

UNITED STATES PATENTS

| Number | Name | Date |
|---|---|---|
| 937,477 | Shonberg | Oct. 19, 1909 |
| 2,258,288 | Heft et al. | Feb. 4, 1934 |